United States Patent
Nochlin

(10) Patent No.: US 12,235,869 B2
(45) Date of Patent: *Feb. 25, 2025

(54) IDENTIFYING CHANGES BETWEEN SOURCE AND DESTINATION DATABASES USING SNAPSHOTS OF SOURCE DATABASE AND INVERTIBLE BLOOM FILTERS

(71) Applicant: Fivetran Inc., Oakland, CA (US)

(72) Inventor: Jason Nochlin, Denver, CO (US)

(73) Assignee: FIVETRAN INC., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,451

(22) Filed: Nov. 15, 2023

(65) Prior Publication Data

US 2024/0086418 A1    Mar. 14, 2024

Related U.S. Application Data

(63) Continuation of application No. 17/529,740, filed on Nov. 18, 2021, now Pat. No. 11,860,891.
(Continued)

(51) Int. Cl.
*G06F 16/27* (2019.01)
*G06F 11/14* (2006.01)
(Continued)

(52) U.S. Cl.
CPC .......... *G06F 16/27* (2019.01); *G06F 11/1446* (2013.01); *G06F 16/2255* (2019.01);
(Continued)

(58) Field of Classification Search
None
See application file for complete search history.

(56) References Cited

U.S. PATENT DOCUMENTS

2015/0199416 A1    7/2015  Kashyap et al.
2016/0216909 A1    7/2016  Provenzano et al.
(Continued)

OTHER PUBLICATIONS

Lailong Luo; Optimizing Bloom Filter: Challenges, Solutions, and Comparisons; IEEE;pp. 1912-1949 (Year: 2019).*
(Continued)

*Primary Examiner* — Albert M Phillips, III
*Assistant Examiner* — Jermaine A Mincey
(74) *Attorney, Agent, or Firm* — Fenwick & West LLP

(57) ABSTRACT

A centralized database management system performs data synchronization with lower bandwidth consumption and higher efficiency. The system manages data synchronization and data reconciliation across multiple databases managed by multiple DBMS across different client servers. The system generates and sends instructions that encode each data table into an invertible bloom filter and identifies differences between the two databases by performing a subtraction operation on the two invertible bloom filters. The system may generate a third invertible bloom filter comprising information associated with differences between the two data tables. The system may send instructions to the source and the destination databases, where a first and a second invertible bloom filters are encoded for the source and the destination databases, respectively. The system may decode the third invertible bloom filter, identify the different elements, and generate instructions to the source and/or the destination database.

20 Claims, 13 Drawing Sheets

Related U.S. Application Data

(60) Provisional application No. 63/115,904, filed on Nov. 19, 2020.

(51) Int. Cl.
  *G06F 16/22* (2019.01)
  *G06F 16/23* (2019.01)
  *G06F 16/24* (2019.01)
  *G06F 16/2453* (2019.01)

(52) U.S. Cl.
  CPC ...... *G06F 16/2282* (2019.01); *G06F 16/2379* (2019.01); *G06F 16/24534* (2019.01)

(56) References Cited

U.S. PATENT DOCUMENTS

| | | |
|---|---|---|
| 2017/0199921 A1 | 7/2017 | Khanlarov et al. |
| 2018/0004829 A1 | 1/2018 | Kathuria et al. |
| 2018/0144029 A1 | 5/2018 | Cruanes et al. |
| 2019/0007208 A1* | 1/2019 | Surla .................. H04L 9/14 |
| 2019/0288850 A1 | 9/2019 | Beecham et al. |
| 2019/0370381 A1* | 12/2019 | Klein .................. G06F 16/182 |
| 2020/0081798 A1 | 3/2020 | Dornquast et al. |
| 2020/0265064 A1 | 8/2020 | Rajenderan et al. |
| 2021/0004357 A1 | 1/2021 | Bagchi et al. |
| 2021/0374157 A1 | 12/2021 | Reddy et al. |

OTHER PUBLICATIONS

Gonen, O., et al. "Exploring GPU architectures to accelerate semantic comparison for intention-based search," Proceedings of the 6th Workshop on General Purpose Processor Using Graphics Processing Units, Mar. 17, 2013, pp. 137-145.

PCT International Search Report and Written Opinion, PCT Application No. PCT/US2021/59947, Feb. 7, 2022, 22 pages.

United States Office Action, U.S. Appl. No. 17/529,732, Jan. 12, 2023, 21 pages.

United States Office Action, U.S. Appl. No. 17/529,732, Jul. 3, 2023, 22 pages.

United States Office Action, U.S. Appl. No. 17/529,740, Jun. 8, 2023, 43 pages.

* cited by examiner

Invertible Bloom Filter table
240

241

| | 231 | 232 | 233 | 234 | 235 | 236 | 237 | 238 |
|---|---|---|---|---|---|---|---|---|
| Count | 0 | 0 | 0 | 0 | 0 | 0 | 0 | 0 |
| idSum | 0 | 0 | 0 | 0 | 0 | 0 | 0 | 0 |
| hashSum | 0 | 0 | 0 | 0 | 0 | 0 | 0 | 0 |

242

| | 231 | 232 | 233 | 234 | 235 | 236 | 237 | 238 |
|---|---|---|---|---|---|---|---|---|
| Count | 0 | 1 | 0 | 1 | 0 | 0 | 1 | 0 |
| idSum | 0 | S1 | 0 | S1 | 0 | 0 | S1 | 0 |
| hashSum | 0 | Hk2 | 0 | Hk1 | 0 | 0 | Hk3 | 0 |

| ID | Email | Age | Paid? | Time Created |
|----|-------|-----|-------|--------------|
| 1 | joe@gmail.com | 37 | TRUE | 2020-11-12 13:14 |
| 2 | alice@gmail.com | 43 | FALSE | 2020-9-1 15:16 |
| 3 | bob@gmail.com | 56 | TRUE | 2020-4-13 11:01 |

710

| Checksum |
|----------|
| 8f6e |
| 7a4z |
| 6e2a |

720

| (Primary key, Checksum) |
|-------------------------|
| (1, 8f6e) |
| (2, 7a4z) |
| (3, 6e2a) |

730

| (Primary key, Email checksum, age, paid?, time created) |
|---------------------------------------------------------|
| (1, 8f6e, 37, 1, 1401231235456) |
| (2, 7a4z, 43, 0, 1400257897123) |
| (3, 6e2a, 56, 1, 1342534256546) |

|         | 231  | 232         | 233  | 234  |
|---------|------|-------------|------|------|
| Count   | 1    | 2           | 0    | 1    |
| idSum   | v1   | v1 ⊕ v2     | 0    | v2   |
| hashSum | Hk11 | Hk12 ⊕ Hk21 | 0    | Hk22 |

910

|         | 231  | 232         | 233  | 234 |
|---------|------|-------------|------|-----|
| Count   | 1    | 2           | 1    | 0   |
| idSum   | v1   | v1 ⊕ v3     | v3   | 0   |
| hashSum | Hk11 | Hk12 ⊕ Hk31 | Hk32 | 0   |

920

|         | 231 | 232         | 233  | 234  |
|---------|-----|-------------|------|------|
| Count   | 0   | 0           | -1   | 1    |
| idSum   | 0   | v2 ⊕ v3     | v3   | v2   |
| hashSum | 0   | Hk21 ⊕ Hk31 | Hk32 | Hk22 |

IDENTIFYING CHANGES BETWEEN SOURCE AND DESTINATION DATABASES USING SNAPSHOTS OF SOURCE DATABASE AND INVERTIBLE BLOOM FILTERS

CROSS-REFERENCE TO RELATED APPLICATIONS

This application is a continuation of U.S. application Ser. No. 17/529,740, filed Nov. 18, 2021, now U.S. Pat. No. 11,860,891, which application claims priority under 35 U.S.C. § 119(e) to U.S. Provisional Patent Application Ser. No. 63/115,904, "A Method and System for Syncing Databases" filed Nov. 19, 2020, the disclosure of which is hereby incorporated by reference herein in its entirety.

BACKGROUND

Data synchronization is a process of establishing data consistency between two or more databases. Synchronization between databases is an ongoing process that may need to be performed on a regular basis to maintain data consistency within systems. Conventional methods that compare and identify different records between two databases may involve costly operations such as scanning records in a data table and copying data records between databases, which often result in high bandwidth consumption. As a result, a method for synchronizing databases that is more efficient and less costly is desirable.

SUMMARY

Systems and methods are disclosed herein for a centralized database management system that performs data synchronization with lower bandwidth consumption and higher efficiency. The centralized database management system manages data synchronization and data reconciliation across multiple databases managed by multiple database management systems (DBMS) across different client servers. The centralized database management system generates and sends instructions that encode each data table into an invertible bloom filter and identifies differences between the two databases by performing a subtraction operation on the two invertible bloom filters.

The centralized database management system may send instructions to each of a source data table and a destination data table for generating an invertible bloom filter for each of the source data table and the destination data table. The centralized database management system may then perform a subtraction operation on the two invertible bloom filters and generates a third invertible bloom filter comprising information associated with differences between the two data tables. The centralized database management system may first send instruction to respective database for transforming each row of the data tables into a row representation which is used for generating invertible bloom filters. A row representation may be a primary key for the row, a two-element tuple including a key and a checksum, or a multiple-element tuple including a key, raw data from the row, and/or checksums.

The centralized database management system may send instructions to each of a source data table and a destination data table for generating an invertible bloom filter for each of the source data table and the destination data table. The centralized database management system may then perform a subtraction operation on the two invertible bloom filters and generates a third invertible bloom filter comprising information associated with differences between the two data tables. The centralized database management system may first send instruction to respective database for transforming each row of the data tables into a row representation which is used for generating invertible bloom filters. A row representation may be a primary key for the row, a two-element tuple including a key and a checksum, or a multiple-element tuple including a key, raw data from the row, and/or checksums. In one embodiment, the centralized database management system may build an invertible bloom filter based on non-data system columns (e.g., system generated columns such as "Create Date") that some databases make available.

In one embodiment, the centralized database management system may update a destination database by generating invertible bloom filter for different snapshots of the source database captured at different points in time. The centralized database management system may, based on an invertible bloom filter generated at a first point in time and an invertible bloom filter generated at a second point in time, generate a third invertible bloom filter by subtracting the second invertible bloom filter from the first one, and identify any updates between the first point in time and the second point in time by decoding the third invertible bloom filter. The centralized database management system may then send instructions to update the destination database by only updating the identified changes.

The disclosed centralized database management system provides multiple advantageous technical features for performing data synchronization with lower bandwidth and higher efficiency. For example, the disclosed system uses a centralized database management system to synchronize two databases without copying raw data from the data tables. This is achieved by encoding an invertible bloom filter for each individual database using a SQL query provided by the centralized database management system. While SQL query is used as an example throughout this disclosure, other database languages (such as XQuery, XML, LINQ, or any other database languages) may be used for generating invertible bloom filters and performing functionalities within a database. The SQL query enables the database management system that manages each database to perform computation for generating invertible bloom filter in a database environment. Further, the centralized database management system transforms each row of data tables into a row representation, which may be a tuple with not only primary keys, but also raw data that can be encoded into the invertible bloom filter. Therefore, to identify updates to make to a destination data table, the updated records and corresponding updated raw data may be identified from the row representation, instead of retrieving and comparing all fields of the updated data record. As a result, the disclosed system reduces the amount of data to copy and reduces bandwidth consumption during the synchronization process. Even more, the disclosed system further provides an efficient method for updating a destination database, by generating invertible bloom filters for a source data table based on different snapshots at different points in time. In the situation where multiple end points need to synchronize with a same source, the centralized database system may send the same identified updates over a time interval to each endpoint, and each endpoint is caught up with the source to the timestamp by the end of the time interval. Similarly, the centralized database system may also create snapshots for situation such as multiple sources synchronizing to one destination, one source synchronizing to multiple destinations, or multiple sources synchronizing to multiple destinations. Moreover, the disclosed system further enhances data security by using invertible bloom filters for identifying updated records, instead of having to access real data which might be sensitive or confidential.

BRIEF DESCRIPTION OF THE DRAWINGS

FIG. 7 illustrates an exemplary row transformation process performed by a row representation transforming module, according to one embodiment.

FIG. 9 illustrates an exemplary embodiment for subtracting a second invertible bloom filter from a first invertible bloom filter, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
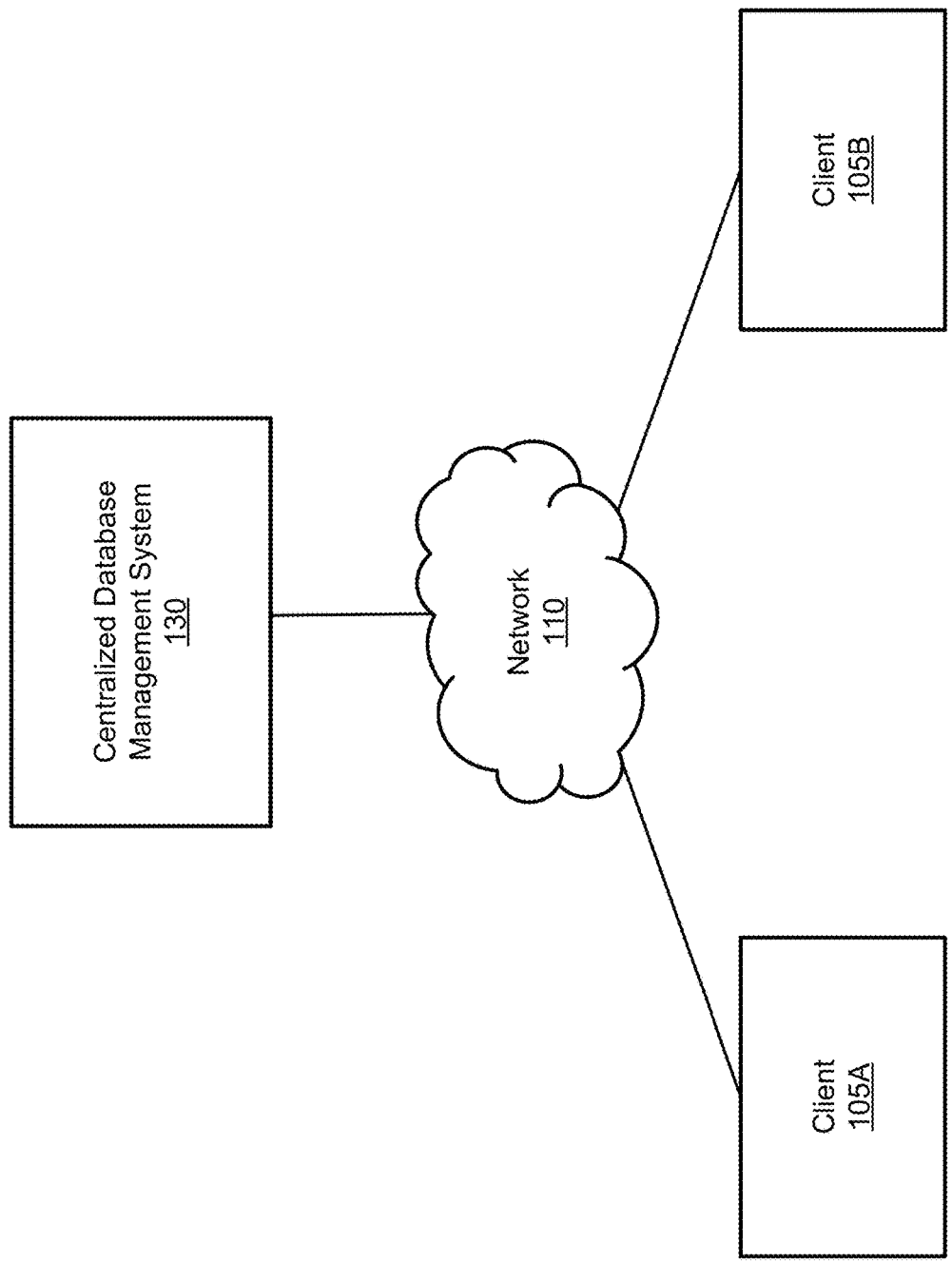
FIG. 1 is a high level block diagram of a system environment for a centralized database management system 130, according to one embodiment.

FIG. 1 is a high level block diagram of a system environment for a centralized database management system 130, in accordance with an embodiment. The system environment 100 shown by FIG. 1 includes one or more clients 105, such as client 105A and client 105B, which may be collectively referred to as clients 105, a network 110, and a centralized database management system 130. In alternative configurations, different and/or additional components may be included in the system environment 100.

The network 110 represents the communication pathways between the client 105 and centralized database management system 130. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one embodiment, client 105 may be a database system that stores and/or manages data tables. While two clients 105A and 105B are illustrated in FIG. 1, in practice any number of multiple clients 105 may communicate with the centralized database management system 130 in the environment 100. Each database may be a relational database that provides searchable access to a plurality of data tables. Each of the plurality of tables comprises a collection of records stored in the database, and each record includes a unique primary key that provides searchable access to each specific record stored on the database. In some embodiments, the data table may not include unique primary keys. Each table may further include a plurality of data fields for storing different types of data, such as integers, floats, Booleans, chars, arrays, strings and more. In one embodiment, each database may implement a database management system (DBMS) that allows each database to execute database related instructions independently. For example, the DBMS for a database may provide for the independent creation of an invertible bloom filter for the plurality of data tables stored on the primary database. The DBMS for a database may also transform a row of a table into a row representation based on instructions received from the centralized database management system 130. Moreover, the DBMS for databases may provide functions for independent insertion or deletion of records within each of the data table for data synchronization with other databases.

Each data table may be associated with a set of metadata. The metadata may include information on the database type of database, the maximum value of the primary key of the records within the data table, and the number of records currently stored within the first table. Metadata may further include information associated with database schema, which may include information related to how data is constructed, such as how data is divided into database tables in the case of relational databases. Database schema information may contain information on each column (i.e., each data field) defined with in the table, such as type for each field, size for each field, relationships, views, indexes, types, links, directories, etc.

The centralized database management system 130 may manage and perform data synchronization between one or more data tables stored across multiple clients such as 105A and 105B. The centralized database management system 130 may be any processor-based computing system capable of generating structured query language (SQL) type instructions or any other relational database management system instructions. The centralized database management system 130 may transmit and receive responses to these instructions from clients 105 over the data network 110.

The centralized database management system 130 may perform functionalities for managing data synchronization between clients 105, such as determining size for invertible bloom filters, estimating the number of different records, generating and sending instructions to clients 105 for generating row representations and generating invertible bloom filters, performing operations such as subtraction on invertible bloom filters, decoding invertible bloom filters, and generating instructions to clients 105 for performing operations that synchronize the databases. The centralized database management system 130 may determine and send instructions to clients 105 for updating the respective database so that a destination database is in synchronization with a source database. Further details with regard to the functionalities performed by the centralized database management system 130 are discussed below in conjunction with FIG. 4.

Encoding Data Using Invertible Bloom Filters

Figure 2:
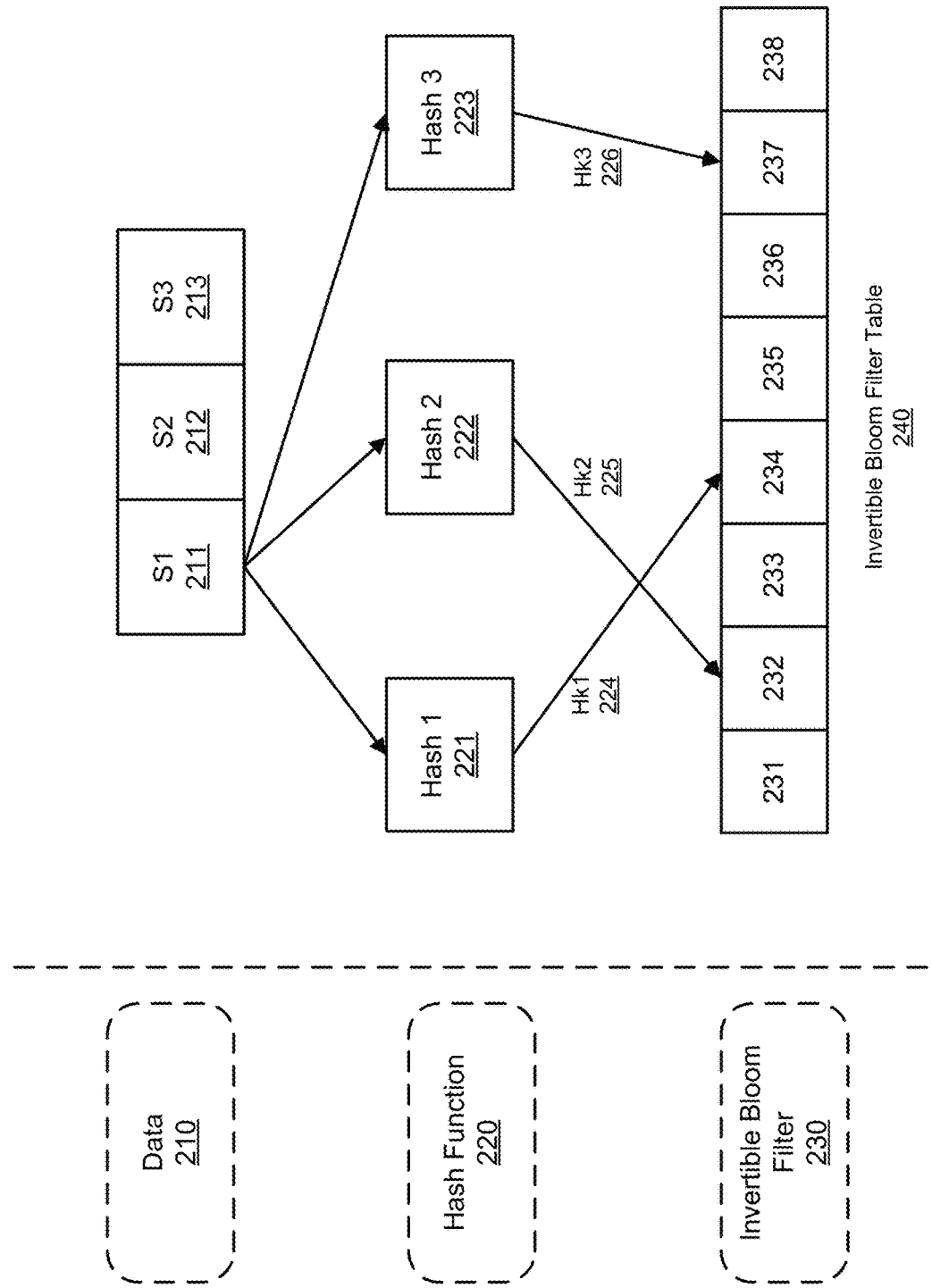
FIG. 2 illustrates an exemplary process for encoding data using an invertible bloom filter, according to one embodiment.

FIG. 2 illustrates an exemplary embodiment for encoding data 210 using an invertible bloom filter 230. In FIG. 2, data 210 may be an array of elements 211, 212, and 213. While only three elements are illustrated in FIG. 2, data 210 may include any number of elements. Each element may be stored as a type of data, such as a tuple that includes a key-value pair. The invertible bloom filter 230 may be initialized with 8 cells such as cells 231-238. The illustrated invertible bloom filter 230 may use one or more hash functions such as the three different hash functions 220 such as hash functions 221, 222, and 223 to generate hash keys for each element 211-213, where each hash function may generate a hash key for each element. For example, to encode element 211 into the invertible bloom filter 230, element S1 is hashed into three hash keys Hk1 224, Hk2 225, and Hk3 226, using the three hash functions 221, 222, and 223. Each hash function may generate a different hash key. For example, passing value of S1 211 into hash function 221 may result in a hash key Hk1 224, which maps S1 into cell 234 of an invertible bloom filter table 240. The invertible bloom filter table 240 is part of the invertible bloom filter 230 and is maintained by the invertible bloom filter 230 for storing information associated with each element mapped to a respective index. Similarly, S1 211 is further hashed using hash function 222 and 223, mapping element S1 into cells 232 and 237 respectively. An exemplary embodiment of the invertible bloom filter table 240 is discussed in greater detail in FIG. 3.

Figure 3:
FIG. 3 illustrates one embodiment of an exemplary invertible bloom filter table, according to one embodiment.

FIG. 3 illustrates one embodiment of an exemplary invertible bloom filter table 240. The invertible bloom filter table 240 may be initialized as a table with a fixed size (e.g., fixed number of columns.) The invertible bloom filter table 240 may include one or more of the following fields: count, idSum and hashSum. The count keeps track of the number of elements mapped to the respective index and is incremented by 1 each time an element is mapped to the index. The filed idSum keeps track of sum (addition or exclusive-or operation) of inserted elements. Each time an element is mapped to a respective index, idSum is updated by adding (or XOR) the element. The field hashSum keeps track of sum (addition or exclusive-or operation) of hash key for the inserted elements. Each time an element is mapped to a cell, hashSum is updated by adding (or XOR) the hash key of the element. In some embodiments, the invertible bloom filter table 240 may include additional fields such as a valueSum field that keeps track of sum of values of inserted elements, if each element corresponds to a key-value pair. As illustrated in FIG. 3 the invertible bloom filter table 240 is of size eight since the invertible bloom filter table 240 has 8 cells (e.g., cells 231-238) and the table may be initialized with null values. To encode element S1 into the invertible bloom filter 230, the element S1 is mapped to indices 232, 234 and 237, based on hash functions. Each field of the invertible bloom filter table 242 including count, idSum, and hashSum is updated as illustrated in invertible bloom filter table 242, where count for each mapped cell increments by 1, idSum is updated by XOR the mapped element, and hashSum is updated by XOR the hash key of the mapped element.

Figure 4:
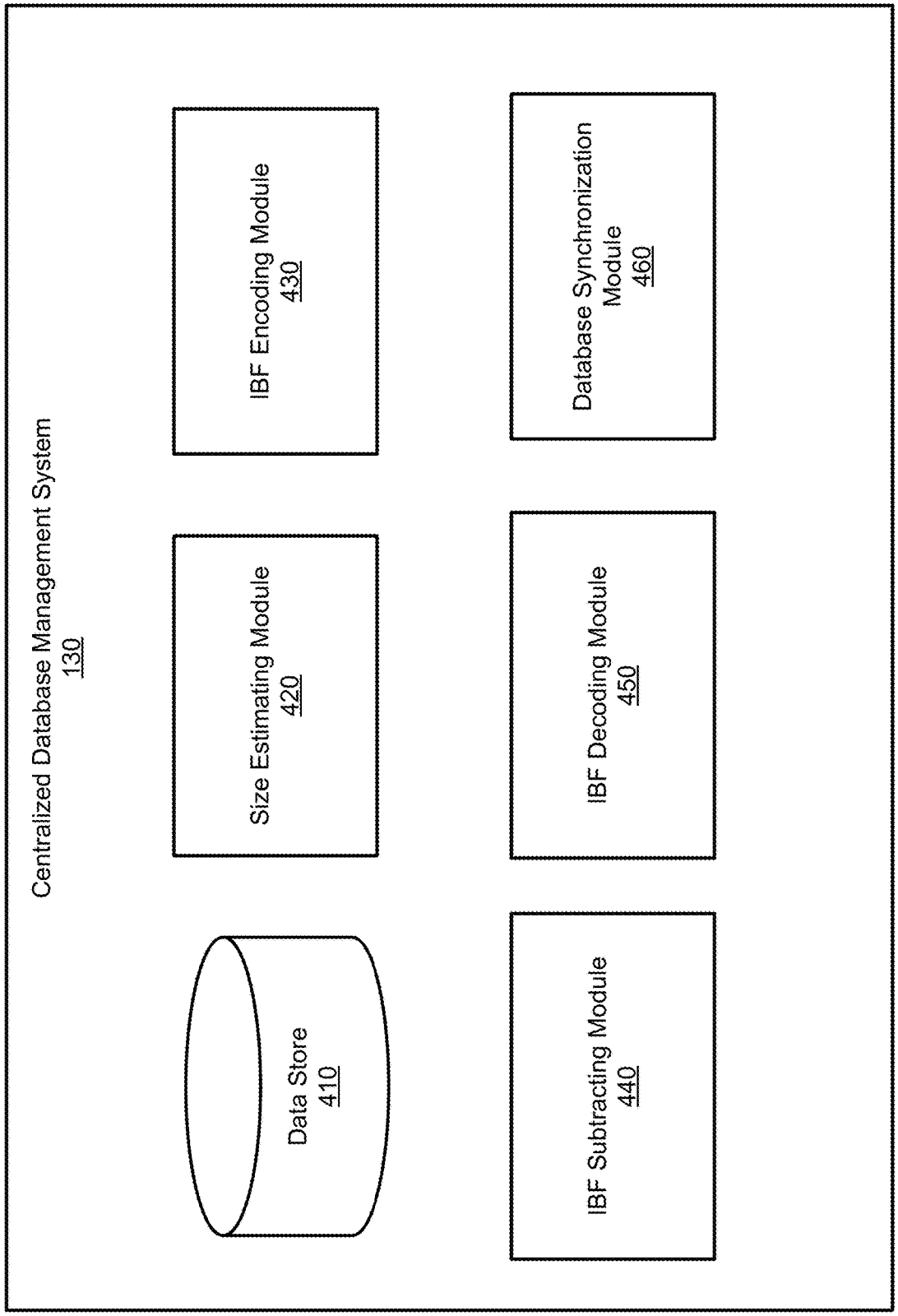
FIG. 4 illustrates an exemplary embodiment of a centralized database management system, according to one embodiment.

FIG. 4 illustrates an exemplary embodiment of the centralized database management system 130. The centralized database management system 130 may include a data store 410 that stores retrieved metadata and other data such as previous versions of invertible bloom filters, a size estimating module 420 that determines a size for invertible bloom filters, an IBF encoding module 430 that generates invertible bloom filters, an IBF subtracting module 440 that performs subtractions on invertible bloom filters, an IBF decoding module 450 that decodes an invertible bloom filter, and a database synchronization module 460 that generates instructions for synchronizing databases.

Data store 410 may store retrieved metadata information associated with databases. In some embodiments, data store 410 may also store other data such as invertible bloom filters that were generated previously and may be retrieved in subsequent steps of the synchronization process. Data store 410 may also include historical data associated with previously performed synchronizations, such as historical number of different elements, or historical number of updates within a period of time. The historical data stored in the data store 410 may be used to estimate number of differences by the size estimating module 420 which is discussed in greater detail below.

Figure 5:
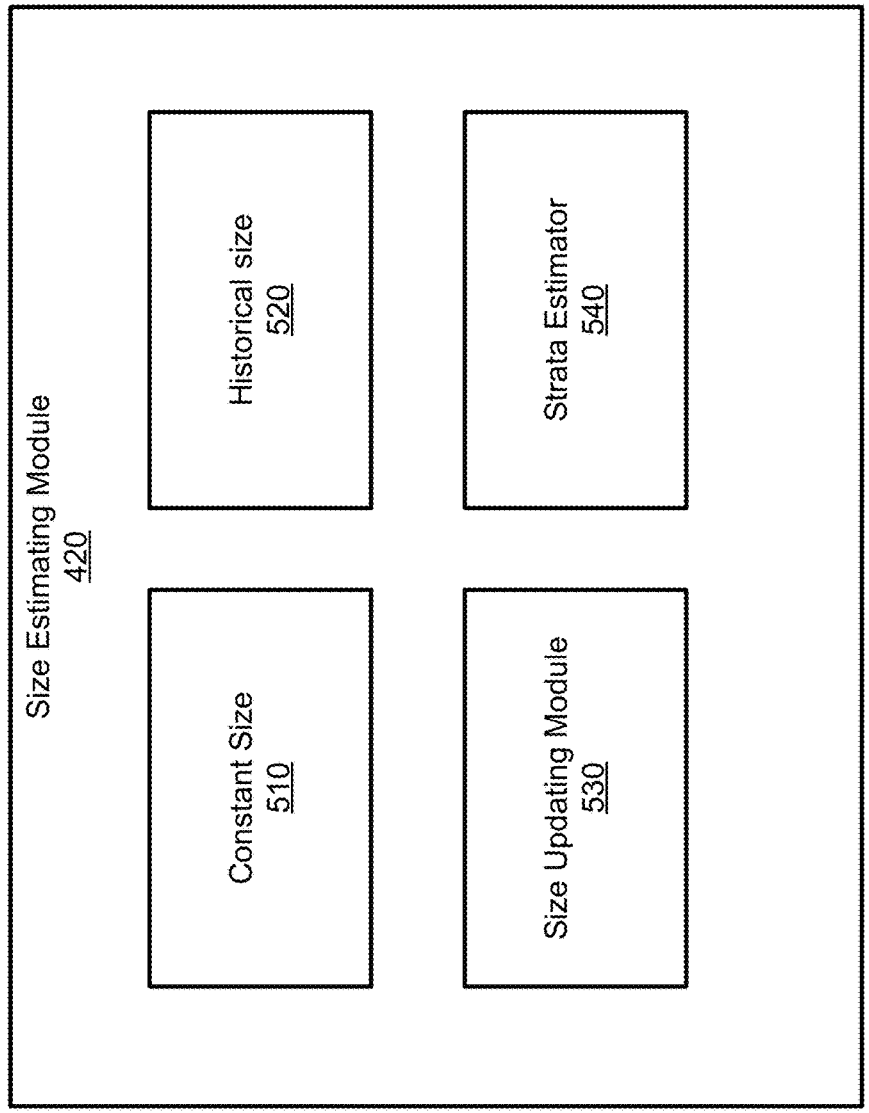
FIG. 5 illustrates an exemplary embodiment for a size estimating module, in accordance with on embodiment, according to one embodiment.

The size estimating module 420 determines a size for invertible bloom filters based on an estimated number of different records. The size estimating module 420 may estimate number of different records using various methods, such as using a constant size, using historical data, through an updating process or through a strata estimator. The different methods may be used independently from each other or may be used in conjunction with other methods. In one embodiment, the size estimating module 420 may determine a size based on metadata (e.g., the size is determined to be a percentage or correlated with the number of rows in the table). The different methods for determining size are discussed in detail in accordance with FIG. 5, which includes a size estimating module 420 includes a constant size module 510, a historical size module 520, a size updating module 530, and a strata estimator 540.

The constant size 510 module may assign a constant size to an invertible bloom filter. The constant size may be a number that does not depend on other factors such as size of a data table. In one embodiment, the constant size may be pre-determined (e.g., by a human). The constant size may be a number that is much greater (e.g., by convention or common sense) than an estimated number of different records between databases to ensure that invertible bloom filters function properly with a larger successful rate during an invertible bloom filter decoding process. The constant size may be an arbitrarily big number that is highly unlikely to result in an issue when generating the invertible bloom filters. However, using a large invertible bloom filter may result in waste in space and create inefficiencies. To refine the size, the determined constant size may also be adjusted by the size updating module 530 responsive to observations of number of differences. The decoding process for an invertible bloom filter is discussed in accordance with IBF decoding module 450.

The historical size module 520 determines size based on historical data including historical numbers of changes in records. The historical size module 520 may train and use a machine learning model for predicting the estimated number of differences based on historical data stored in the data store 410. In one embodiment, the historical size module 520 may train a machine learning model to predict the number of different records between a source database and a destination database. The training data may further include time intervals associated with the estimated number of different records. In one embodiment, the historical size module 520 may also train a machine learning model to predict the number of updates occurred to a source database within a time interval (or within various time intervals). The historical size module 520 may determine a size for invertible bloom filters based on the estimated number of updates. In one embodiment, the machine learning model may be a supervised or unsupervised machine learning model that is trained based on features extracted from historically observed differences and other information such as time interval, time of the day, time of the year, size of data tables, etc.

The size updating module 530 may update a determined size based on observed data associated with synchronizations performed afterwards. In one embodiment, the size updating module 530 may receive data associated with a synchronization process and, responsive to observing that the number of differences is significantly smaller that the determined size, the module 530 may determine to reduce the initially determined size. As an example, the size estimating module 420 size may initially determine the size to be a constant that is large enough that ensures proper functioning of the invertible bloom filter, such as a size of 500,000. After performing one synchronization, 10 differences may be observed. The size updating module 530 may reduce the size to 50,000. Responsive to one more observation of 10 differences from another synchronization, the size updating module 530 may further reduce the size to 5,000. The iterative process may be terminated until a predetermine criteria (such as a minimum size threshold) is achieved. In one embodiment, the size updating module 530 may also determine a size for a backup invertible bloom filter, which is activated responsive to the original invertible bloom filter is approaching capacity limit.

In one embodiment, the size updating module 530 may implement a resizable invertible bloom filter. The size updating module 530 may generate a resizable invertible bloom filter at a first snapshot of a source database. In one embodiment, the size updating module 530 may determine a maximum size for the first snapshot. The size updating module 530 may also determine a set of smaller sizes that the resizable invertible bloom filter may be shrunken to (e.g., a set of possible sizes that are predetermined). The size updating module 530 may determine a size for a second snapshot of the source database. The size updating module 530 may try to encode the snapshot into a size that is smaller than the maximum size. The size updating module 530 may request a second invertible bloom filter of the smaller size from the source database. Responsive to the smaller size invertible bloom filter failing to be decoded by the IBF decoding module 450, the size updating module 530 may retry the operation of encoding the second snapshot using a bigger size available from the set of possible sizes. The process is repeated iteratively until the maximum possible size is reached.

In one embodiment, the size estimating module 420 may use the strata estimator 540 for estimating the number of differences. The strata estimator 540 may first divide all elements in the source data table and the destination data table into different levels of partitions, each partition containing different numbers of elements. The strata estimator 540 may encode each partition into an invertible bloom filter for each data table. The strata estimator 540 may then attempt to decode the pair of invertible bloom filters at each level for the two databases. If the invertible bloom filters for a level of partitions are successfully decoded, then the strata estimator 540 may add a count to the estimate, where the count is proportional to the number of elements recovered from the decoding process. Further details with regard to a decoding process is discussed below in accordance with the IBF decoding module 450.

Continuing with the discussion of FIG. 4, the IBF encoding module 430 encodes a data table into an invertible bloom filter. The IBF encoding module 430 may also generate and send instructions to databases for encoding a data table into an invertible bloom filter. Although the IBF encoding module 430 is illustrated to be included in the centralized database management system 130, clients 105 may also perform the functionalities described here in accordance with the IBF encoding module 430.

Figure 6:
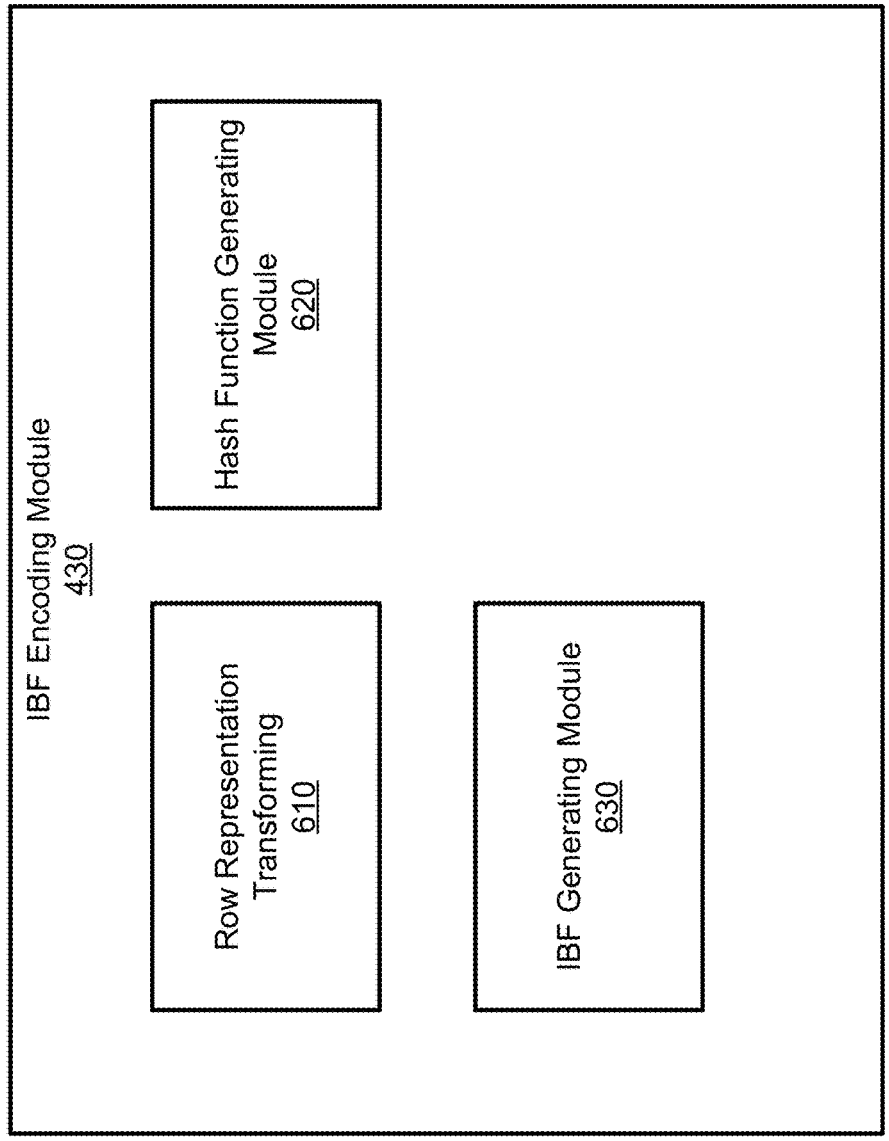
FIG. 6 illustrates an exemplary embodiment various row representations, according to one embodiment.

In one embodiment, the IBF encoding module 430 may use a SQL query for generating an IBF for a data table in a database environment. The SQL query takes a data table as input, and outputs an encoded IBF. The IBF encoding module 430 may also use other database languages (such as XQuery, XML, etc.) that are capable of managing transactions associated with data records within a database environment for encoding a data table into invertible bloom filters. FIG. 6 illustrates an exemplary embodiment of the IBF encoding module 430, which includes a row representation transforming module 610 that transforms rows in data table into row representations, a hash function generating module 620 that determines hash functions for the invertible bloom filters, and an IBF generating module 630 that uses determined hash function to generate invertible bloom filters and invertible bloom filter tables. Functionalities for each module is discussed in detail below.

Row representation transforming module 610 transforms each row of a data table into a row representation that is used for encoding invertible bloom filters. Each row of a table may be referred to as a data record or an element. Each data record may include multiple fields with different types of data. In one embodiment, the row representation transforming module 610 may transform a row into a checksum or a tuple. The tuple may be a key-value pair, with the key being the primary key of the row, and checksum encoded based on data in the rest of the fields of the data record. In one embodiment, row representation transforming module 610 may convert a row into a tuple with multiple elements, where some elements of the tuple are directly encoded from raw data. Examples of transformed row representations are illustrated in FIG. 7.

FIG. 7 depicts an exemplary raw data table 710 and exemplary transformed row representations for rows in the data table 710. In some embodiments, the data table may also include system columns. The data table 710 may include three records with IDs (or primary key) being 1, 2 and 3. Each record is associated with fields such as email, age, whether the respective employee is paid (field: Paid?), and a time when the record is created (field: Time Created). Each field may be further associated with a data type that the data is stored as. For example, email may be stored as a string, age may be stored as an integer, whether the employee is paid may be stored as a Boolean, and Time Created may be stored as an integer. In a first embodiment as illustrated in 720, each row of the table 710 may be converted into a checksum, which are then used to be encoded into an invertible bloom filter.

In the embodiment illustrated in table 730, the row representation transforming module 610 may transform each row of table 710 into a two-element tuple, with a primary key and checksum, where the checksum is encoded based on the data fields for each record. Encoding each row into a two-element tuple representation with primary key may be efficient when an element is identified as a different record. With a primary key associated with the checksum, the different record may be identified in a data table more efficiently by locating the record using the primary key. In some embodiments, the field primary key is not required, and each row is transformed into a one-element representation.

In the embodiment illustrated in table 740, the row representation transforming module 610 may transform each row of table 710 into a multi-element tuple, with a primary key, and raw data from the data table 710. In one embodiment, raw data that may be encoded as part of a row representation are data that can be stored as fixed length, such as a fixed size integer, Boolean, or time. For example, the row with ID 1 includes information associated with fields email, age, paid? and time created, among which, age, paid?, and time created may be encoded as raw data into the row representation as illustrated in table 740, because these fields may be formatted as fixed-length data across all records. In one embodiment, row representation may also include timestamps such as modification timestamp and/or creation timestamp. On the other hand, emails may be encoded in the row representation after it is translated to a checksum that is of fixed length across all data records. The examples used here are for illustration purposes only. The row representation transforming module 610 may encode any type of raw data into the row representations if the data field meets certain criteria (e.g., capable of being formatted into a certain size).

Continuing with the discussion of FIG. 6, the hash function generating module 620 determines one or more hash functions for mapping row representations to invertible bloom filters. If the one or more data elements determined to be used to compare the first and second tables is the primary key alone, then the invertible bloom filter database may include at least an idSum field, a hashSum field, and a count field. In one embodiment, such as for a table without primary keys, the one or more elements determined to be used to compare the first and the second tables may be any one of the data elements. Moreover, the invertible bloom field hash function is an integer hash function.

Alternatively, if the one or more data elements determined to be used to compare the first and second tables is a combination of the primary key and a timestamp, then the invertible bloom filter database schema may include at least a first id sum field, a second id sum field, a hash sum field, and a count field. Moreover, the invertible bloom filter hash function is a two-word vector hash function where the first word is the integer hash function of the primary key and the second word is the integer epoch timestamp value of modification timestamp.

Alternatively, if the one or more data elements determined to be used to compare the first and second tables is a combination of the primary key and one or more data elements, then the invertible bloom filter database schema may include at least a first id sum field, a second id sum field, a hash sum field, and a count field. Moreover, the invertible bloom filter hash function is a two-word vector hash function where the first word is the integer hash function of the primary key and the second word is a checksum value of the one or more data elements.

In any scenario, the determined hash function is a function constructed solely of basic mathematical operations and bitwise operations. This constraint ensures successful implementation of the selected hash function on the databases the database management systems and the centralized database management system 130.

The IBF generating module 630 generates invertible bloom filters based on information generated by the module mentioned above, including a determined size for the invertible bloom filters, determined hash functions, and transformed row representations. The IBF generating module 630 may use a SQL query to generate the invertible bloom filters. In one embodiment, the IBF generating module 630 may send instructions (e.g., a SQL query including information for generating invertible bloom filters) to each database involved in the synchronization, and each database may run the SQL query that encodes a data table into an invertible bloom filter, where the invertible bloom filter is of the determined size. For a data synchronization process performed on a source data table and a destination data table, the size of the invertible bloom filter for the source data table is the same as the size of the invertible bloom filter for the destination data table.

After the IBF encoding module 430 generates and sends instructions to the clients 105 for generating invertible bloom filters, each client 105 may encode a data table into an invertible bloom filter and sends the encoded invertible bloom filter back to the centralized database management system 130, where the IBF subtracting module 440 may perform subtraction operation on the received invertible bloom filters to identify differences, which is discussed in greater detail below.

Figure 8:
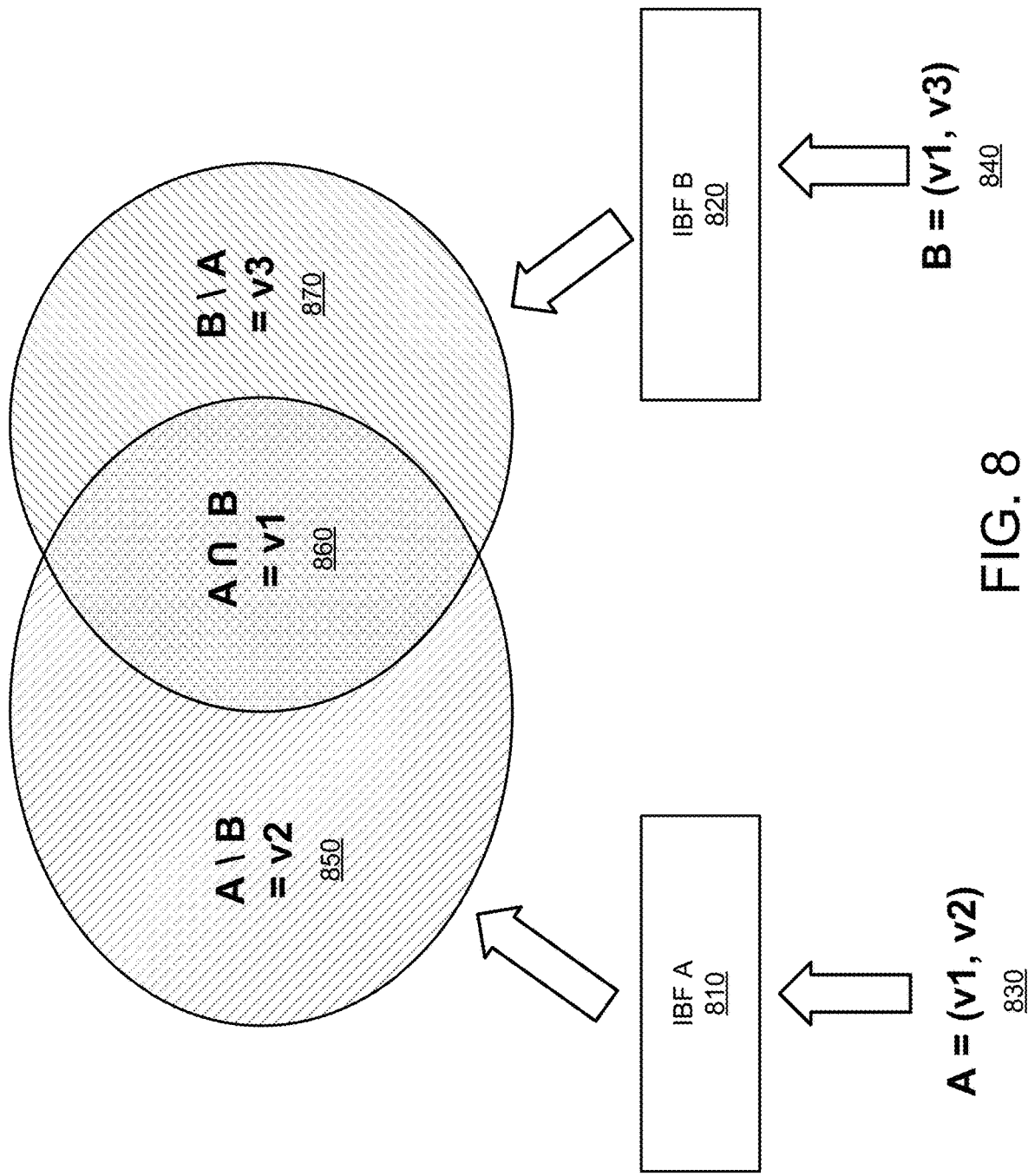
FIG. 8 depicts a high-level illustration for subtracting two invertible bloom filters, according to one embodiment.

Referring back to FIG. 4, the IBF subtracting module 440 generates a third invertible bloom filter by performing a subtraction operation on two invertible bloom filters generated by each of the source and the destination databases. The resulting third invertible bloom filter contains information regarding different elements between the first and the second bloom filters. FIG. 8 is a high-level illustration for subtracting two invertible bloom filters. In FIG. 8, Set A 830 and set B 840 may each comprise a plurality of row representations generated by row representation transforming module 610 for two data tables. The row representations for each set may also be referred to as set members. Sets A 830 and B 840 may have some common members A∩B 860, and some different members such as set members in A but not in B, illustrated as A\B 850, and set members in B but not in A, illustrated as B\A 870. The different members may be collectively referred to as AΔB. To identify different set members, i.e., AΔB, the centralized database management system 130 may identify A\B and B\A by subtracting IBF B 820 encoded based on set B 840 from IBF A 810 encoded based on set A 830. In one embodiment, the subtraction operation may be performed via an XOR (exclusive-OR) operation between the set A 830 and the set B 840. An XOR operation may cancel out any common elements between set A 830 and set B 840, leaving only the elements that are different, i.e., AΔB. Further details illustrated with a concrete example are discussed in FIG. 9.

FIG. 9 illustrates an exemplary embodiment for subtracting a second invertible bloom filter 910 from a first invertible bloom filter 910, which results in a third invertible bloom filter 930. In FIG. 9, invertible bloom filter 910 is generated based on a first set including set members v1 and v2, where v1 is mapped to indices 231 and 232, and v2 is mapped to indices 232 and 234. Invertible bloom filter 920 is generated based on a second set including set members v1 and v3, where v1 is mapped to indices 231 and 232, and v2 is mapped to indices 232 and 233. The common element between the two sets is v1 and the different elements are v2 and v3. The IBF subtracting module 440 may subtract invertible bloom filter 920 from invertible bloom filter 910 by performing arithmetic subtraction or XOR operation for each cell of the two invertible bloom filters. For the count field, an arithmetic operator subtraction may be applied, resulting in a count of −1 for index 233 in the third invertible bloom filter 930, which indicates that the respective element is in the invertible bloom filter 920 and not in the invertible bloom filter 910. The count field for index 234 is 1, which may indicate that a respective element is in the invertible bloom filter 910 and not in the invertible bloom filter 920. For the field idSum and hashSum, an XOR operation may be applied to compute a sum taking into account of each mapped element. For example, idSum for index 231 is v1 for both the invertible bloom filters 910 and 920. The IBF subtracting module 440 performs an XOR operation on the two cells, that is, v1 XOR v1=0. Similarly, for index 232, performing an XOR operation on v1⊕v2 (idSum from invertible bloom filter 910) and v1⊕v3 (idSum from invertible bloom filter 920) cancels v1 and preserves v2 and v3, resulting in v2⊕v3 (idSum for invertible bloom filter 930 with index 232). The third invertible bloom filter resulting from the subtraction operation performed by the IBF subtracting module 440 is decoded by the IBF decoding module 450 discussed below.

Referring back to FIG. 4, IBF decoding module 450 may decode the invertible bloom filter resulted from the subtraction operation performed by the IBF subtracting module 440. The resulted invertible bloom filter may also be referred to herein as the third invertible bloom filter. The IBF decoding module 450 may scan the third invertible bloom filter for pure cells, where pure cells are cells within the third invertible bloom filter table whose Count field is equal to 1 or −1 and whose hashSum field is equal to a value that is valid for the corresponding idSum field. A hashSum field's validity may be determined by calculating a hash value using the idSum field values and comparing this calculated value to the value stored in the HashSum field. For each pure cell within the third invertible bloom filter table, if the corresponding Count field is equal to 1, then the IBF decoding module 450 may add the cell to a first listing that includes those cells included in the first table and not in the second table. Alternatively, if the corresponding Count field is equal to −1, then the cell is added to a second listing that includes those cells included in the second table and not in the first table. In an alternative embodiment, for invertible bloom filters that include a checksum, the IBF encoding module 430 may leave out the hashSum field without computing hash values using the idSum field. The IBF decoding module 450 may check purity by checking that the Count field is 1 or −1 and then compute the invertible bloom filter hash functions on the idSum fields to find the indices of cells that the element would be inserted into. Then the IBF decoding module 450 may check if the current cell's index matches one of the computed cell indices. Once all the pure cells within the third invertible bloom filter table have been added to either the first listing and the second listing, the first and second listings are compared to identify those entries with the same primary key. The identified entries represent those cells in both the first and second tables but have updates in fields. The elements in the first listing and the second listing represent differences between the first table and the second table, and based on the identified differences, the database synchronization module 460 may further generated instructions for the databases to perform for the synchronization process.

The database synchronization module 460 may generate instructions to databases and complete the synchronization process by sending instructions to database management system for updating the data tables. In one embodiment, the database synchronization module 460 may generate instructions based on the identified different element, where the instructions may include adding the element, removing the element, or updating the element. The instructions may be generated and sent to the source data table and/or the destination data table based on different goals. In the embodiment where each row representation is a two-element tuple with a key and a checksum, if a record is identified to have been updated in the source data table, the database synchronization module 460 may need to retrieve the respective record with raw data for all fields from the source data table, and send the data to the destination data table, where one or more different fields are updated based on the source data table. In the embodiment where each row representation is encoded with some elements being the raw data taken from each row, if a record is identified to have been updated in the source data table, the database synchronization module 460 may compare the row representation from the source data table with the row representation from the destination data table and identify one or more elements in the tuple that need to be updated, instead of retrieving the entire record of raw data from a database.

Synchronization Between a Source Database and a Destination Database

Figure 10:
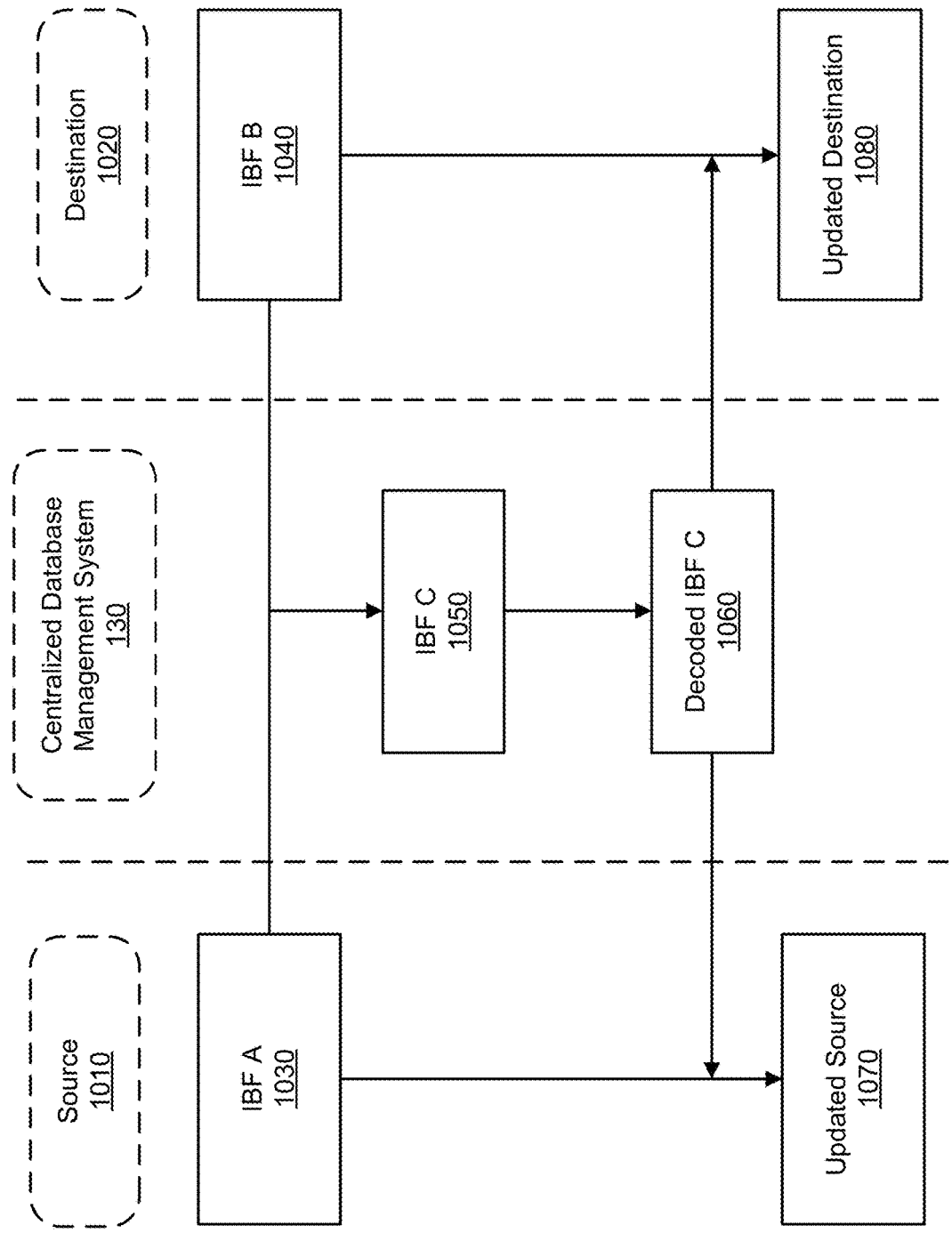
FIG. 10 illustrates one exemplary embodiment for the centralized database management system to synchronize a source database and a destination database, according to one embodiment.

FIG. 10 illustrates one exemplary embodiment for the centralized database management system 130 to synchronize a source database 1010 and a destination database 1020. The centralized database management system 130 may first retrieve metadata information from the source database 1010 and destination database 1020 for determining a size for invertible bloom filters and determining a formatting for encoding the invertible bloom filters. The centralized database management system 130 may send instructions to each of the source database 1010 and the destination database 1020 for encoding Invertible Bloom Filter A 1030 and Invertible Bloom Filter B 1040. Each of the source database 1010 and destination database 1020 runs a SQL query that transforms each row of a table into a row representation and generates Invertible Bloom Filter A 1030 and Invertible Bloom Filter B 1040, respectively. The centralized database management system 130 may retrieve the Invertible Bloom Filter A 1030 and the Invertible Bloom Filter A 1040 and perform a subtraction operation that generates an Invertible Bloom Filter C 1050. The centralized database management system 130 may decode the Invertible Bloom Filter C 1050 and identify any elements that are not in synchronization between the source database 1010 and the destination database 1020. The centralized database management system 130 may send the identified elements to the source database 1010 and/or the destination database 1020 for data reconciliation, which results in an updated source database 1070 and an updated destination database 1080.

Synchronization Based on Snapshots of a Source Databases

Figure 11:
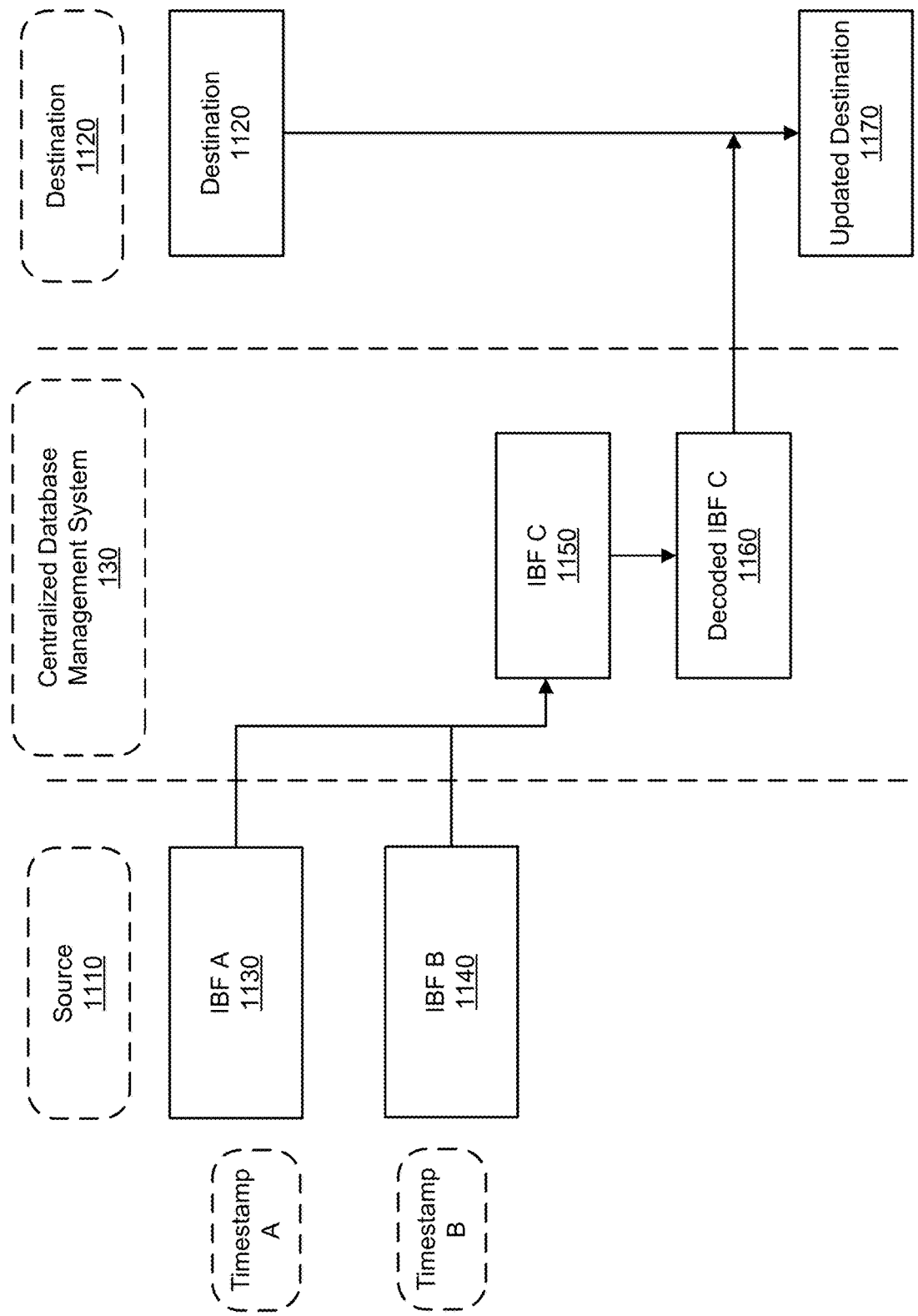
FIG. 11 illustrates an exemplary process for updating a destination database based on snapshots of a source database, according to one embodiment.

FIG. 11 illustrates an exemplary process for updating a destination database 1120 based on snapshots of a source database 1110. The term "snapshot" as used herein may refer to information including data and metadata associated with the database at a point in time. The term "snapshot" as used herein may refer to a copy of the data and metadata of the database, or the original data and metadata stored in the database. Snapshot may refer to the original database at a point in time or may refer to a copy of the database at a point in time. In the embodiment illustrated in FIG. 11, destination database 1120 may be in synchronization with the source database 1110 at timestamp A. However, the source database 1110 may have updates during the time interval between a timestamp A and timestamp B, and a destination database 1120 may need to also perform the updates such that the destination database 1120 and the source data base 1110 are in synchronization.

The size estimating module 420 of the centralized database management system 130 may first determine a size for invertible bloom filter based on an estimated number of different records between timestamp A and timestamp B for the source data base 1110. In one embodiment, the size estimating module 420 may not be able to use a strata estimator 540 to determine the size, because the source database 1110 is already updated. The size estimating module 420 may initialize the size as a constant size 510 that is way larger than the number of potential updates. After observing several results from data synchronization processes, the size updating module 530 may update the size to improve efficiency.

The centralized database management system 130 may send instructions including the determined size for invertible bloom filters to the source database 1110. The source database 1110, based on instructions from the centralized database management system 130 may generate a first Invertible Bloom Filter A 1130 based on the source database 1110 snapshotted at timestamp A. In one embodiment, the first Invertible Bloom Filter A 1130 may be stored to the data store 410 of the centralized database management system 130.

At timestamp B, the centralized database management system 130 or the destination database 1120 may determine that the destination database 1120 may include outdated data, where the determination may be based on the length of the time interval. The centralized database management system 130 may send instructions to the source database 1110 to generate a second Invertible Bloom Filter B 1140 based on the source database 1110 snapshotted at timestamp B. The source database 1110 may encode a second Invertible Bloom Filter B 1140 based on the instructions and send the second Invertible Bloom Filter B 1140 back to the centralized database management system 130. The IBF subtracting module 440 of the centralized database management system 130 may perform a subtraction operation for the first Invertible Bloom Filter A 1130 and the second Invertible Bloom Filter B 1140, which generates an Invertible Bloom Filter C 1150. The IBF decoding module 450 may decode the Invertible Bloom Filter C 1150 and generates a decoded Invertible Bloom Filter C 1160. The centralized database management system 130 may identify updated elements between the source database 1110 snapshotted at timestamp A and timestamp B and sends the identified updates to the destination database 1120. The destination database 1120 may update (e.g., delete, add, update) respective records and becomes an updated destination database 1170.

In one embodiment, the source database 1110 and/or the destination database 1120 may include confidential or sensitive data that are not accessible to external servers or database management systems, which makes data synchronization across different databases challenging. The embodiment illustrated in FIG. 11 provides a solution for the challenge. Because the source database 1110 encodes the first Invertible Bloom Filter B 1140 and the second Invertible Bloom Filter B 1150 locally based on instructions received from centralized database management system 130, the centralized database management system 130 does not need to access the raw data stored in the source database 1110 to identify different or updated elements. The centralized database management system 130 may receive invertible bloom filters that contain information encoded as checksums and perform subtraction operation on the invertible bloom filters, which results in a third invertible bloom filter containing information for the updates.

In one embodiment, the source database 1110 may be associated with multiple destination databases 1120 that need to synchronize with the source database 1110. The embodiment as illustrated in FIG. 11 may generate a set of instructions that is applicable to multiple destination databases 1120 that need to be updated. The centralized database management system 130 may only rely on information associated with the source database 1110 for generating instructions that identifies updates during a time interval, and the generated instructions may be sent to multiple destination databases 1120 for data synchronization. In alternative embodiments, the centralized database system 130 may also create snapshots for situation such as multiple sources synchronizing to one destination, one source synchronizing to multiple destinations, or multiple sources synchronizing to multiple destinations.

Figure 12:
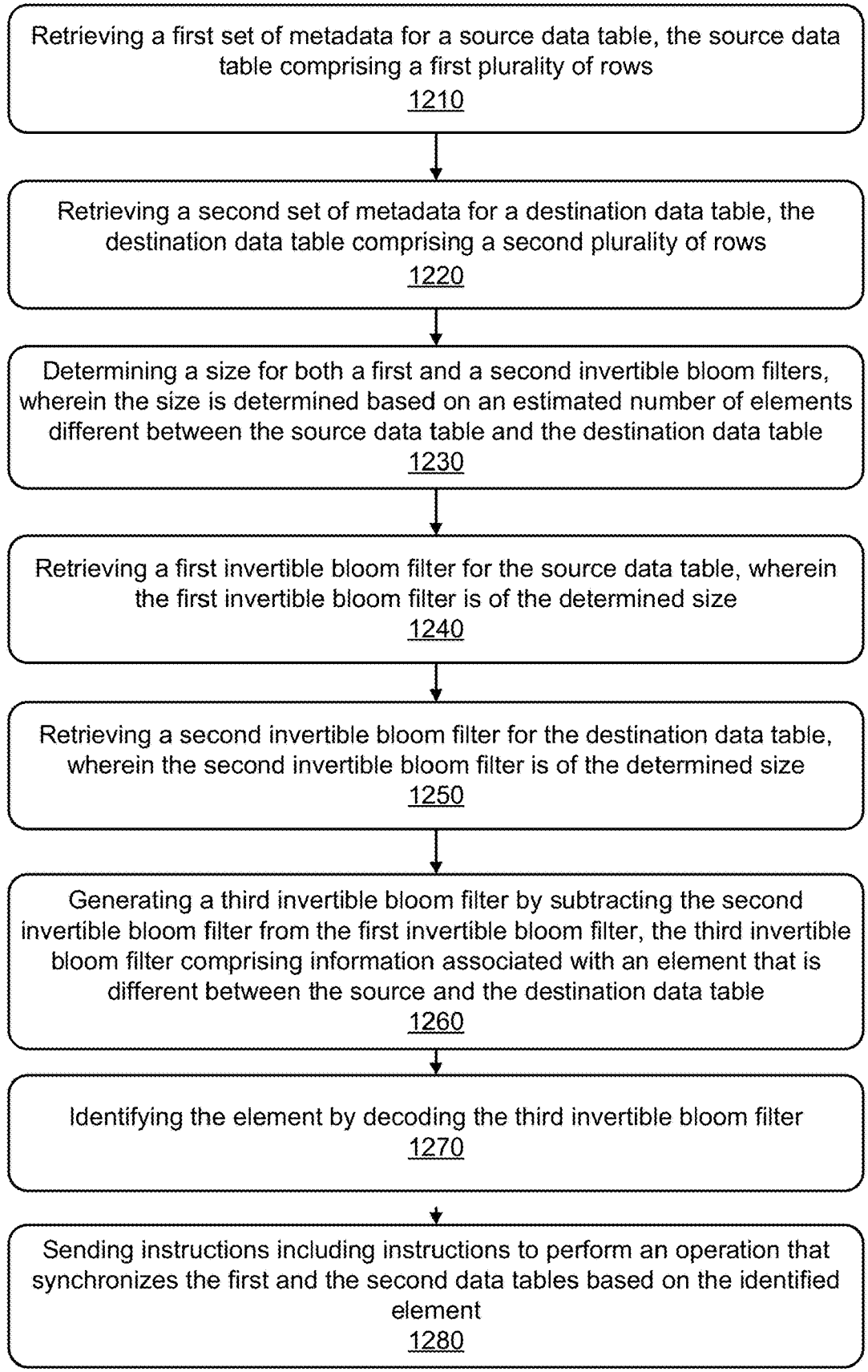
FIG. 12 illustrates an exemplary synchronization process between a source database and a destination database, according to one embodiment.

FIG. 12 illustrates an exemplary process that centralized database management system 130 manages a synchronization process between a source database and a destination data base. The process starts with the centralized database management system 130 receiving 1210 a first set of metadata for a source data table that comprises a first plurality of rows and receiving 1220 a second set of metadata for a destination data table that comprises a second plurality of rows. The size estimating module 420 may determine 1230 a size for both a first and a second invertible bloom filters based on an estimated number of elements that are different between the source data table and the destination data table. The centralized database management system 130 may send instructions to the source data table and the destination data table including size and instructions for generating row representations to the source database and the destination database. The centralized database management system 130 may retrieve 1240 a first invertible bloom filter for the source data table, the first invertible bloom filter being of the determined size. The centralized database management system 130 may retrieve 1250 a second invertible bloom filter for the destination data table, the second invertible bloom filter being the determined size. The IBF subtracting module 440 may generate 1260 a third invertible bloom filter by subtracting the second invertible bloom filter from the first invertible bloom filter, the third invertible bloom filter comprising information associated with an element that is different between the source and the destination data table. The IBF decoding module 450 may identify 1270 the different element by decoding the third invertible bloom filter. The database synchronization module 460 may generate and send instructions including instructions to perform an operation that synchronizes the first data table with the second data table based on the identified different element.

Figure 13:
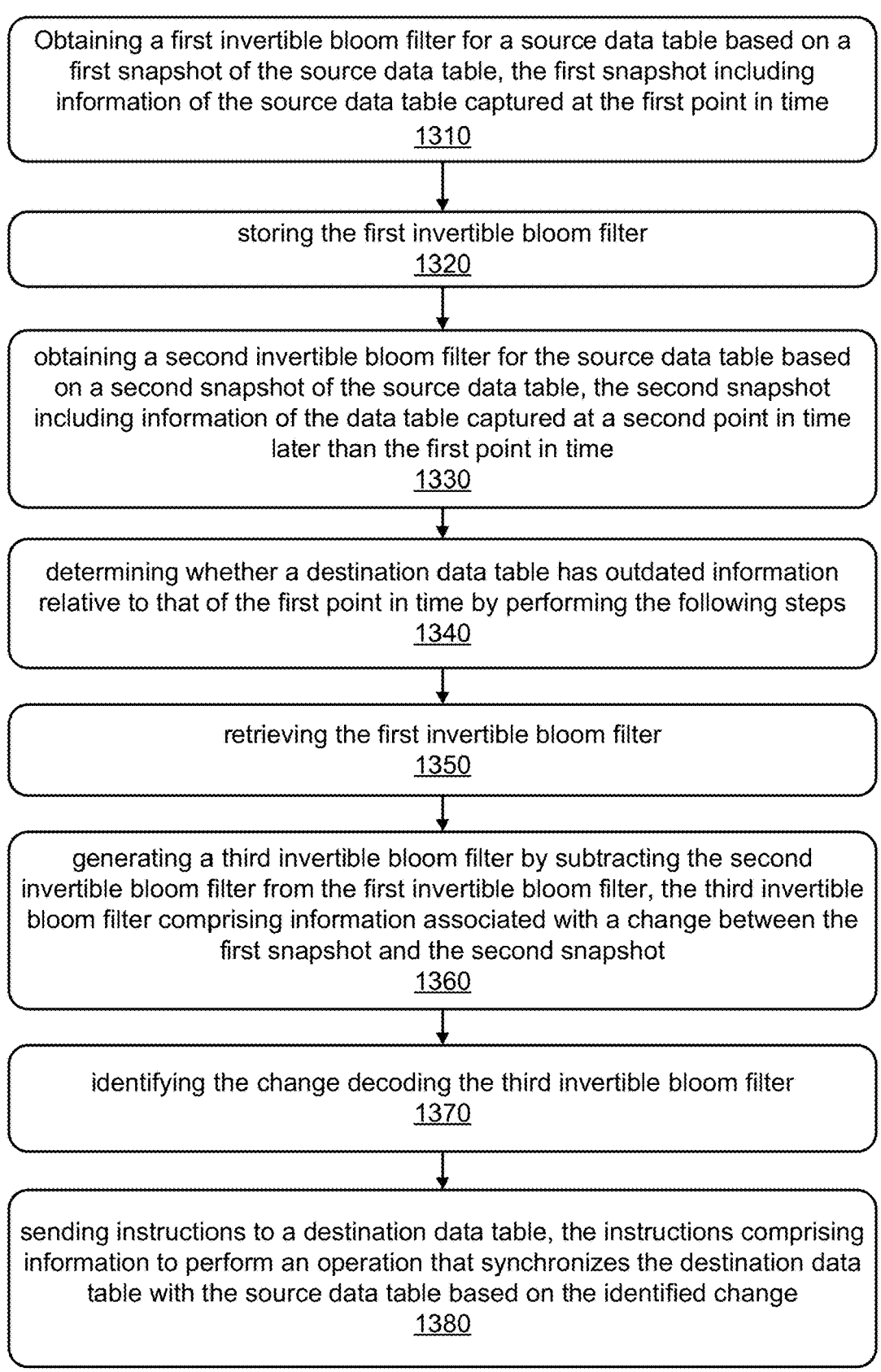
FIG. 13 illustrates an exemplary synchronization process between a source database and a destination database based on snapshots of the source database, according to one embodiment.

FIG. 13 illustrates an exemplary process that centralized database management system 130 manages a synchronization process between a source database and a destination database by identifying difference between two snapshots of the source database. The process starts with the centralized database management system 130 obtaining 1310 a first invertible bloom filter for a source data table based on a first snapshot of the source data table, where the first snapshot includes information of the source data table captures at the first point in time. The centralized database management system 130 may store the first invertible bloom filter in data store 410. The centralized database management system 130 may obtain 1330 a second invertible bloom filter for the source data table based on a second snapshot of the source data table, the second snapshot including information of the data table captured at a second point in time later than the first point in time. The centralized database management system 130 may determine 1340 whether a destination database has outdated information relative to that of the first point in time by performing the following steps including retrieving 1350 the first invertible bloom filter from the data store 410 and generating 1360 a third invertible bloom filter by subtracting the second invertible bloom filter from the first invertible bloom filter, the third invertible bloom filter comprising information associated with a change between the first snapshot and the second snapshot. The IBF decoding module 450 may identify the change during the time interval between the first point in time and second point in time by decoding the third invertible bloom filter. The database synchronization module 460 may send instructions to the destination database, where the instructions comprise information to perform an operation that synchronizes the destination data table with the source data table based on the identified change.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving training data of a machine learning model through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method comprising:
retrieving a source data table and a destination data table;
determining a size for both a first invertible bloom filter and a second invertible bloom filter based on an estimated number of changes to the source data table, wherein an invertible bloom filter of a larger size occupies a larger space in a computer memory, and wherein determining the size for both the first invertible bloom filter and the second invertible bloom filter comprises:
   determining a difference between the estimated number of changes and an actual number of changes to the source data table, and
   adjusting the size responsive to the difference meeting a threshold;
obtaining the first invertible bloom filter for the source data table, the first invertible bloom filter having the determined size;
obtaining the second invertible bloom filter for the destination data table, the second invertible bloom filter having the determined size;
generating a third invertible bloom filter by subtracting the second invertible bloom filter from the first invertible bloom filter, the third invertible bloom filter comprising information associated with a change between the source data table and the destination data table;
identifying the change by decoding the third invertible bloom filter; and
transmitting information associated with the identified change to the destination data table to synchronize the destination data table with the source data table based on the identified change.

2. The method of claim 1, wherein determining the size for both the first invertible bloom filter and the second invertible bloom filter further comprises:
   iteratively adjusting the size responsive to additional changes to the source data table.

3. The method of claim 1, wherein adjusting the size responsive to the difference meeting the threshold comprises: decreasing the size responsive to the difference being smaller than the threshold.

4. The method of claim 1, further comprising responsive to the first and the second invertible bloom filter including a number of empty cells, compressing the first invertible bloom filter into a compressed invertible bloom filter by reducing the size.

5. The method of claim 1, wherein determining the size for both the first invertible bloom filter and the second invertible bloom filter further comprises:
   generating a backup invertible bloom filter for the first invertible bloom filter; and
   activating the backup invertible bloom filter responsive to the difference meeting the threshold.

6. The method of claim 1, wherein the change between the source data table and the destination data table is identified without accessing data entries of the source data table.

7. The method of claim 1, wherein the size for both the first invertible bloom filter and the second invertible bloom filter is determined as a constant that is larger than a threshold value.

8. A non-transitory computer-readable storage medium storing executable computer instructions that, when executed by one or more processors, cause the one or more processors to perform operations, the instructions comprising instructions to:
retrieve a source data table and a destination data table;
determine a size for both a first invertible bloom filter and a second invertible bloom filter based on an estimated number of changes to the source data table, wherein an invertible bloom filter of a larger size occupies a larger space in a computer memory, and wherein determining the size for both the first invertible bloom filter and the second invertible bloom filter comprises:
   determining a difference between the estimated number of changes and an actual number of changes to the source data table, and
   adjusting the size responsive to the difference meeting a threshold;
obtain the first invertible bloom filter for the source data table, the first invertible bloom filter having the determined size;
obtain the second invertible bloom filter for the destination data table, the second invertible bloom filter having the determined size;
generate a third invertible bloom filter by subtracting the second invertible bloom filter from the first invertible bloom filter, the third invertible bloom filter comprising information associated with a change between the source data table and the destination data table;
identify the change by decoding the third invertible bloom filter; and
transmit information associated with the identified change to the destination data table to synchronize the destination data table with the source data table based on the identified change.

9. The non-transitory computer-readable storage medium of claim 8, wherein the instructions to determine the size for both the first invertible bloom filter and the second invertible bloom filter comprise instructions to:
   iteratively adjust the size responsive to additional changes to the source data table.

10. The non-transitory computer-readable storage medium of claim 8, wherein the instructions to adjust the size responsive to the difference meeting the threshold comprise instructions to: decrease the size responsive to the difference being smaller than the threshold.

11. The non-transitory computer-readable storage medium of claim 8, wherein the instructions further comprise instructions to responsive to the first and the second invertible bloom filter including a number of empty cells, compress the first invertible bloom filter into a compressed invertible bloom filter by reducing the size.

12. The non-transitory computer-readable storage medium of claim 8, wherein the instructions to determine the size for both the first invertible bloom filter and the second invertible bloom filter comprise instructions to:
   generate a backup invertible bloom filter for the first invertible bloom filter; and
   activate the backup invertible bloom filter responsive to the difference meeting the threshold.

13. The non-transitory computer-readable storage medium of claim 8, wherein the change between the source data table and the destination data table is identified without accessing data entries of the source data table.

14. The non-transitory computer-readable storage medium of claim 8, wherein the size for both the first invertible bloom filter and the second invertible bloom filter is determined as a constant that is larger than a threshold value.

15. A computing system comprising:
a processor; and
a non-transitory computer-readable storage medium storing instructions for database synchronization, the instructions when executed by the processor cause the processor to perform steps including:

retrieving a source data table and a destination data table;

determining a size for both a first invertible bloom filter and a second invertible bloom filter based on an estimated number of changes to the source data table, wherein an invertible bloom filter of a larger size occupies a larger space in a computer memory, and wherein determining the size for both the first invertible bloom filter and the second invertible bloom filter comprises:

determining a difference between the estimated number of changes and an actual number of changes to the source data table, and adjusting the size responsive to the difference meeting a threshold;

obtaining the first invertible bloom filter for the source data table, the first invertible bloom filter having the determined size;

obtaining the second invertible bloom filter for the destination data table, the second invertible bloom filter having the determined size;

generating a third invertible bloom filter by subtracting the second invertible bloom filter from the first invertible bloom filter, the third invertible bloom filter comprising information associated with a change between the source data table and the destination data table;

identifying the change by decoding the third invertible bloom filter; and transmitting information associated with the identified change to the destination data table to synchronize the destination data table with the source data table based on the identified change.

16. The computing system of claim 15, wherein determining the size for both the first invertible bloom filter and the second invertible bloom filter further comprises:

iteratively adjusting the size responsive to additional changes to the source data table.

17. The computing system of claim 15, wherein adjusting the size responsive to the difference meeting the threshold comprises: decreasing the size responsive to the difference being smaller than the threshold.

18. The computing system of claim 15, wherein the steps further comprise: responsive to the first and the second invertible bloom filter including a number of empty cells, compressing the first invertible bloom filter into a compressed invertible bloom filter by reducing the size.

19. The computing system of claim 15, wherein determining the size for both the first invertible bloom filter and the second invertible bloom filter further comprises:

generating a backup invertible bloom filter for the first invertible bloom filter; and activating the backup invertible bloom filter responsive to the difference meeting the threshold.

20. The computing system of claim 15, wherein the size for both the first invertible bloom filter and the second invertible bloom filter is determined as a constant that is larger than a threshold value.

* * * * *